United States Patent [19]

Kaul

[11] Patent Number: 4,623,397
[45] Date of Patent: Nov. 18, 1986

[54] SURFACE COATINGS PIGMENTED WITH A 1-(DICHLORO-4'-SULFAMOYL OR SUBSTITUTED SULFAMOYL-PHENYLAZO-2-HYDROXY-3-PHENYLCARBAMOYL OR SUBSTITUTED PHENYLCARBAMOYL-NAPHTHALENE

[75] Inventor: Bansi L. Kaul, Biel-Benken, Switzerland

[73] Assignee: Sandoz Ltd., Basel, Switzerland

[21] Appl. No.: 659,246

[22] Filed: Oct. 10, 1984

Related U.S. Application Data

[62] Division of Ser. No. 410,175, Aug. 20, 1982, abandoned.

[30] Foreign Application Priority Data

Aug. 28, 1981 [DE] Fed. Rep. of Germany ....... 3134126

[51] Int. Cl.$^4$ .............. C08K 5/23; C09B 29/01; C09B 29/20; D06P 1/18
[52] U.S. Cl. .................. 106/308 Q; 8/662; 8/696; 106/23; 106/288 Q; 106/309; 162/162; 534/575; 534/581; 534/864; 534/887
[58] Field of Search ............... 260/203, 204; 534/864; 106/288 Q, 308 Q, 309, 23; 162/162

[56] References Cited

U.S. PATENT DOCUMENTS

| | | | |
|---|---|---|---|
| 1,927,115 | 9/1933 | Eichwede | 260/203 |
| 2,004,383 | 6/1935 | Schimmelschmidt et al. | 260/204 |
| 2,066,986 | 1/1937 | Lamberz | 260/204 |
| 2,209,749 | 7/1940 | Schrader et al. | 260/204 |

FOREIGN PATENT DOCUMENTS

| | | | |
|---|---|---|---|
| 700160 | 12/1940 | Fed. Rep. of Germany | 260/204 |
| 724831 | 9/1942 | Fed. Rep. of Germany | 260/204 |
| 1225321 | 9/1966 | Fed. Rep. of Germany | 260/204 |
| 452749 | 5/1968 | Switzerland | 260/204 |
| 509384 | 8/1971 | Switzerland | 260/204 |
| 496735 | 12/1938 | United Kingdom | 260/204 |
| 1226633 | 3/1971 | United Kingdom | 260/176 |
| 1366598 | 9/1974 | United Kingdom | 260/176 |

*Primary Examiner*—Floyd D. Higel
*Attorney, Agent, or Firm*—Gerald D. Sharkin; Richard E. Vila; Melvyn M. Kassenoff

[57] ABSTRACT

Compounds of the formula I

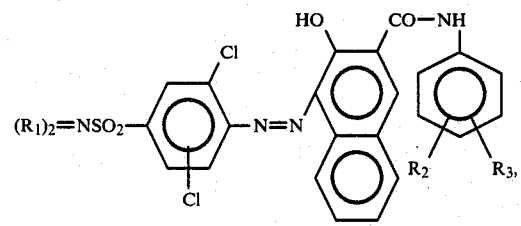

in which each $R_1$, independently, is hydrogen, $C_{1-8}$alkyl, $C_{2-3}$alkyl substituted by one or two substituents selected from the group consisting of halo, hydroxy, cyano, methoxy, ethoxy and ($C_{1-2}$alkoxy)carbonyl or cyclohexyl, and each $R_2$ and $R_3$, independently, is hydrogen, chlorine, bromine, methyl, methoxy or ethoxy, their production and use as pigments for the mass pigmentation of, for example, viscose, surface coatings such as oil and water base paints and lacquers and inks, pigment printing, textile coating and pigmenting paper in the mass.

5 Claims, No Drawings

SURFACE COATINGS PIGMENTED WITH A 1-(DICHLORO-4'-SULFAMOYL OR SUBSTITUTED SULFAMOYL-PHENYLAZO-2-HYDROXY-3-PHENYLCARBAMOYL OR SUBSTITUTED PHENYLCARBAMOYL-NAPHTHALENE

This application is a division of application Ser. No. 410,175, filed Aug. 20, 1982 and now abandoned.

The invention relates to azo compounds.

The invention provides azo compounds of formula I

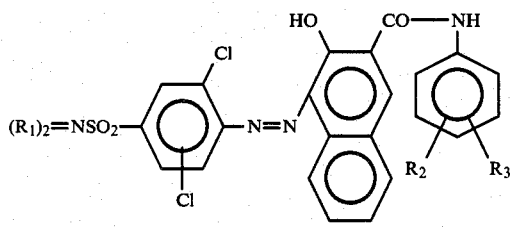

in which
each of $R_1$, independently, is hydrogen; $C_{1-8}$alkyl; $C_{2-3}$-alkyl substituted by up to two substituents selected from halogen, hydroxy, cyano, methoxy, ethoxy and ($C_{1-2}$alkoxy)carbonyl; or cyclohexyl, and each $R_2$ and $R_3$, independently, is hydrogen, chlorine, bromine, methyl, methoxy or ethoxy.

Any unsubstituted alkyl group as $R_1$ may be straight-chain or branched. The unsubstituted $C_{1-8}$alkyl groups are preferably $C_{1-4}$alkyl, more preferably $C_{1-3}$alkyl and particularly methyl or ethyl groups.

Halogen is preferably chlorine or bromine, more preferably chlorine.

Preferably the substituted $C_{2-3}$alkyl groups as $R_1$ are monosubstituted. Preferred substituents are cyano, hydroxy, methoxy, ethoxy and chlorine, more preferably hydroxy.

Each $R_1$ is preferably $R_1'$, where either both $R_1'$ are identical and signify $C_{1-2}$alkyl or one $R_1'$ is hydrogen and the other is $C_{1-2}$alkyl.

$R_2$ is preferably $R_2'$, where $R_2'$ is hydrogen, chlorine, methyl, methoxy or ethoxy. More preferably, $R_2$ is $R_2''$, where $R_2''$ is methyl or methoxy.

$R_3$ is preferably $R_3'$, where $R_3'$ is hydrogen, chlorine or methyl. More preferably, $R_3$ is hydrogen.

Preferred compounds of formula I are those in which each $R_1$ is $R_1'$, $R_2$ is $R_2'$ and $R_3$ is $R_3'$. More preferred compounds of formula I are those in which $R_2$ is $R_2''$ and $R_3$ is hydrogen.

The present invention further provides a process for the production of azo compounds of formula I comprising coupling a diazo derivative of an amine of formula II

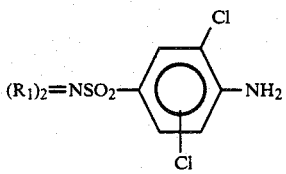

with a compound of formula III

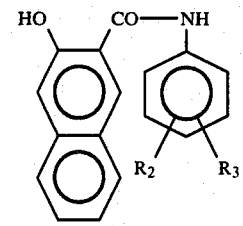

The diazotization and coupling reactions are carried out in accordance with known methods.

The compounds of formulae II and III are either known or may be prepared in accordance with known methods from available starting materials.

The resulting compounds of formula I may be isolated and purified in conventional manner.

The compounds of formula I are useful as pigments, e.g. for the mass pigmenting of, e.g., viscose, surface coatings, such as paints, whether of an oil or water base, lacquers and inks. They may also be used in pigment printing, textile coating and for pigmenting paper in the mass. They may be employed for such uses in conventional manner and in conventional amounts.

The pigmentations obtained employing the compounds of formula I possess notably good fastness properties.

Before use, i.e. after synthesis, the pigments of formula I may be post-treated in an organic solvent, e.g. treated at the boil for a period up to 24 hours in a solvent such as ethanol, 2-methoxyethanol, 2-ethoxyethanol, o-dichlorobenzene or dimethylformamide and preferably milled. Such a treatment may be desirable since it may allow the conversion of the pigment into another advantageous crystalline form or have a purifying effect.

The following Examples, in which all parts and percentages are by weight and all temperatures in degrees Centigrade, illustrate the invention.

EXAMPLE 1

(a) Diazotization 53.8 Parts 1-amino-2,5-dichlorobenzene-4-sulphonic acid dimethylamide are slowly introduced with stirring into a mixture of 147 parts glacial acetic acid and 60 parts water. After the mixture has been stirred at room temperature for 16 hours, 117 parts 30% hydrochloric acid are added, the mixture is then cooled to about 0° C. by the addition of 60 parts ice and simultaneously 14 parts of a 4N sodium nitrite solution are added over the course of 5 minutes. The resulting mixture is then stirred for 1 hour at 0°–5° and thereafter the excess sodium nitrite is destroyed with a small amount of aminosulphonic acid. After 5 minutes stirring, 2.0 parts filtering earth are added to the mixture which is then filtered. The filtration residue is washed with 10 parts water which are then combined with the filtrate.

(b) Coupling component 58.6 Parts 2-hydroxy-3-naphthoic acid-2'-methoxy-phenylamide are dissolved with stirring in 350 parts water, 10 parts commercially available anionic surfactant (liquid) and 53.4 parts NaOH 30%. 2.0 Parts filtering earth are added and the mixture is subsequently filtered. The filtration residue is washed with 10 parts water which are then combined with the filtrate.

(c) Coupling

10 Parts commercially available anionic surfactant in liquid form are added to the diazonium salt solution of (a) above and the resulting mixture is cooled to 0°–5°. Whilst cooling and stirring, the coupling component solution prepared under (b) is added to the mixture over 3 hours. The reaction mixture is further stirred for 2 hours at 0°–5° and then for 1 hour at 22°–25°, heated for 1 hour at 80° and finally filtered. The resulting pigment is washed with 5,000 parts water and then dried. The product possesses a scarlet shade.

By treating the pigment for about 2 hours in dimethylformamide at the boil, there is obtained a product having a red shade; when used after milling for colouring surface coatings, the resulting pigmentations have good light fastness.

EXAMPLE 2

12.75 Grams 1-amino-2,5-dichloro-benzene-4-sulphonic aicd monomethylamide are introduced with stirring into 50 ml glacial acetic acid and 20 ml 30% hydrochloric acid. After the mixture has been cooled to about 0°, 6.3 ml of a 8N sodium nitrite solution are slowly added with stirring and stirring is then continued at 0°–5° for a further hour. The excess nitrite is destroyed by the addition of a small amount of aminosulphonic acid and the diazonium salt solution is filtered.

13.85 Grams 2-hydroxy-3-naphthoic acid (2'-methylphenyl)amide are dissolved in 62 ml water and 10 ml 30% NaOH. After the addition of 2.5 ml commercially available liquid anionic surfactant, the mixture is cooled to about 0° and then added very slowly with stirring to the cooled diazonium solution. Stirring is then continued for a further hour at about 0°, 4 hours at 20° and 1 hour at 90°. The resulting red pigment is filtered, washed acid-free and dried in conventional manner.

EXAMPLE 3

By following the procedure of Example 1, 1-amino-2,5-dichlorobenzene-4-sulphonic acid dimethylamide is diazotised and coupled with 2-hydroxy-3-naphthoic acid4'-chlorophenylamide. The resulting pigment is treated at reflux for 1 hour in dimethylformamide and milled. This treatment produces a shade change from red to orange. The light fastness of the resulting pigmentations are improved.

By following the procedure of Examples 1, 2 and 3, the compounds of formula

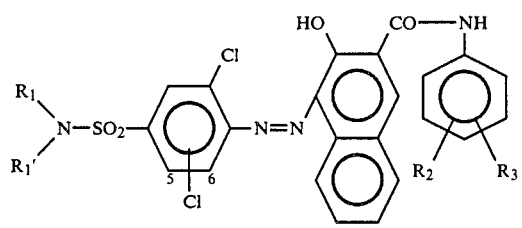

as defined in Table 1 are obtained.

TABLE 1

| Ex. No. | $R_1$ | $R_1'$ | $R_2$ | $R_3$ | Position of the 2nd Cl | Shade |
|---|---|---|---|---|---|---|
| 4 | —CH₃ | —CH₃ | H | H | 5 | yellowish-red |
| 5 | " | " | 2-CH₃ | H | 5 | red |
| 6 | " | " | 2-OCH₃ | 4-OCH₃ | 5 | red |
| 7 | " | " | 4-Cl | H | 5 | red |
| 8 | " | " | 4-Cl | H | 5 | yellowish-red |
| 9 | " | " | 2-CH₃ | 4-Cl | 5 | yellowish-red |
| 10 | " | " | 2-Cl | 4-Cl | 5 | yellowish-red |
| 11 | " | " | 2-Cl | 5-Cl | 5 | red |
| 12 | " | " | 2-Cl | H | 5 | red |
| 13 | " | " | 4-OCH₃ | H | 5 | yellowish-red |
| 14 | " | " | 4-Cl | H | 6 | yellowish-red |
| 15 | " | " | 2-OC₂H₅ | H | 5 | yellowish-red |
| 16 | " | H | 2-OCH₃ | H | 5 | red |
| 17 | —C₂H₅ | —C₂H₅ | " | H | 5 | red |
| 18 | H | H | 2-CH₃ | H | 5 | red |
| 19 | H | H | 2-CH₃ | 4-Cl | 5 | red |
| 20 | —CH₃ | H | " | H | 5 | red |
| 21 | " | H | " | 4-Cl | 5 | red |
| 22 | —C₂H₅ | H | " | H | 5 | red |
| 23 | " | H | " | 4-Cl | 5 | red |
| 24 | —CH₃ | H | H | H | 5 | red |
| 25 | —C₂H₅ | H | H | H | 5 | red |
| 26 | " | H | 2-OCH₃ | H | 5 | red |
| 27 | " | —C₂H₅ | H | H | 5 | yellowish-red |

By following the procedure of Examples 1, 2 and 3, the compunds of the formula

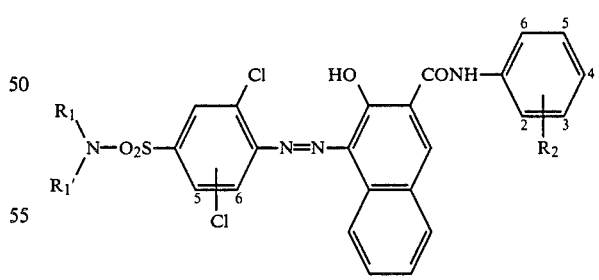

as defined in Table 2 are obtained.

| Ex. No. | $R_1$ | $R_1'$ | $R_2$ | Position of the 2nd chlorine | Shade |
|---|---|---|---|---|---|
| 28 | CH₂CH₂CN | CH₂CH₂CN | 2-CH₃ | 5 | red |
| 29 | " | " | 2-OCH₃ | 5 | red |
| 30 | H | " | 2-CH₃ | 5 | red |
| 31 | H | CH₂CH₂COOC₂H₅ | 2-CH₃ | 5 | red |
| 32 | CH₂CH₂OH | CH₂CH₂OH | 2-CH₃ | 5 | red |
| 33 | " | " | 2-OCH₃ | 5 | red |

-continued

| Ex. No. | $R_1$ | $R_1'$ | $R_2$ | Position of the 2nd chlorine | Shade |
|---|---|---|---|---|---|
| 34 | H | " | 2-$CH_3$ | 5 | red |
| 35 | H | " | 2-$OCH_3$ | 5 | red |
| 36 | $CH_2CH_2OCH_3$ | $CH_2CH_2OCH_3$ | 2-$CH_3$ | 5 | red |
| 37 | H | " | 2-$OCH_3$ | 5 | red |
| 38 | cyclohexyl | H | 2-$CH_3$ | 5 | red |
| 39 | " | cyclohexyl | 2-$CH_3$ | 5 | red |
| 40 | $CH_2CH_2Cl$ | H | 2-$CH_3$ | 6 | red |
| 41 | $CH_2CH_2CH_3$ | $CH_2CH_2CH_3$ | 2-$CH_3$ | 6 | red |
| 42 | " | " | 2-$CH_3$ | 6 | red |
| 43 | H | $CH_2CH_2CH_2CH_3$ | 2-$OCH_3$ | 6 | red |

The compounds of Examples 4 to 6 and 8 to 14 are preferably aftertreated in boiling dimethylformamide and milled.

APPLICATION EXAMPLE

Four parts of the pigment of Example 1 are added to 96 parts of a mixture of
50 parts of a 60% solution of coco aldehyde-melamine resin of 32% fat content in xylene,
30 parts of a 50% melamine resin solution in butanol,
10 parts of xylene and
10 parts of ethylene glycol monoethylether
and the mixture ground for 24 hours in a ball mill. The dispersion obtained is sprayed on an aluminum sheet, and the spray coating is allowed to dry in the air for 30 minutes and then stoved for 30 minutes at 120°. A scarlet film with very good light and weathering fastness is obtained.

What is claimed is:

1. A surface coating pigmented with a compound of the formula

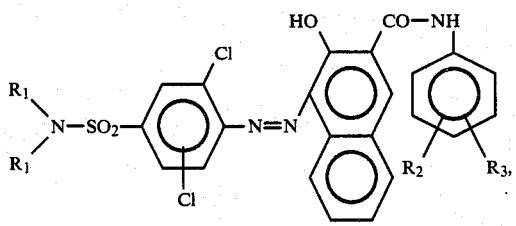

wherein
each $R_1$ is independently hydrogen, $C_{1-8}$alkyl, cyclohexyl or $C_{2-3}$alkyl substituted by 1 or 2 substituents selected from halo, hydroxy, cyano, methoxy, ethoxy and ($C_{1-2}$alkoxy)carbonyl, and
each of $R_2$ and $R_3$ is independently hydrogen, chloro, bromo, methyl, methoxy or ethoxy.

2. A surface coating according to claim 1 wherein the compound is the compound of the formula

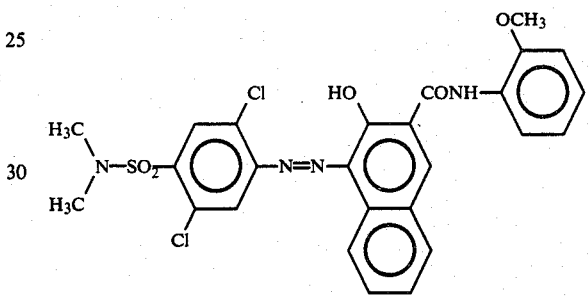

3. A surface coating according to claim 1 wherein the compound is the compound of the formula

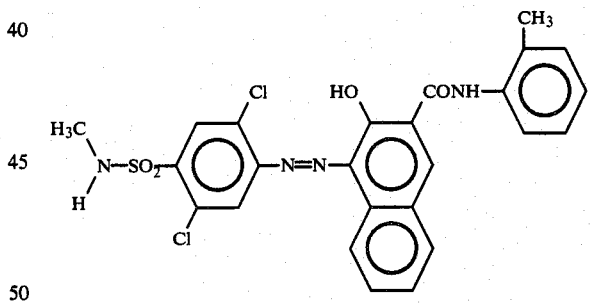

4. A surface coating according to claim 1 wherein the compound is a compound of the formula
wherein
both $R'_1$'s are identical and are $C_{1-2}$alkyl or one $R'_1$ is hydrogen and the other is $C_{1-2}$alkyl,
$R'_2$ is hydrogen, chloro, methyl, methoxy or ethoxy, and
$R'_3$ is hydrogen, chloro or methyl.

5. A surface coating according to claim 1 wherein
$R'_2$ is methyl or methoxy, and
$R'_3$ is hydrogen.

* * * * *